United States Patent [19]

Basta

[11] Patent Number: 4,998,811
[45] Date of Patent: Mar. 12, 1991

[54] TELESCOPIC RIFLE SIGHT WITH AUTOMATIC SETTING OF THE ELEVATION BY AN ELECTROMOTOR

[76] Inventor: Walter Basta, Zanaschkagasse 12/29/3, A-1220 Wien, Austria

[21] Appl. No.: 944,410

[22] Filed: Dec. 18, 1986

[30] Foreign Application Priority Data

Dec. 18, 1985 [AT] Austria ............................ 3667/85

[51] Int. Cl.⁵ ...................... G02B 23/00; G02B 15/16
[52] U.S. Cl. ................................................. 350/560
[58] Field of Search ............................. 350/560–570, 350/537; 35/246, 245

[56] References Cited

U.S. PATENT DOCUMENTS

| | | | |
|---|---|---|---|
| 3,392,450 | 7/1968 | Herter et al. | 33/245 |
| 3,506,330 | 4/1970 | Allen | 350/560 |
| 3,672,782 | 6/1972 | Akin | 350/562 |
| 4,255,013 | 3/1981 | Allen | 350/560 |
| 4,497,548 | 2/1985 | Burris | 350/560 |

OTHER PUBLICATIONS

John Maynard, "Guessers of the Purple Sage", *Gun Digest*, 1969, pp. 111–115.

Primary Examiner—Jon W. Henry
Attorney, Agent, or Firm—Herbert Dubno

[57] ABSTRACT

A telescopic sight for a sharp shooting rifle has an inner tube with a main telescope outer tube formed with an objective lens system, which includes a variable magnification optical system. This optical system is controlled by a cam sleeve on the inner tube rotatable by a setting ring on the main tube. A lens of the variable magnification optical system is connected to an elongated cam which fits between an elevational setting screw on the main tube to adjust the angular position of the inner tube to set the elevation in accordance with the magnification and hence the distance to the target.

9 Claims, 4 Drawing Sheets

TELESCOPIC RIFLE SIGHT WITH AUTOMATIC SETTING OF THE ELEVATION BY AN ELECTROMOTOR

FIELD OF THE INVENTION

The present invention relates, in general, to a telescopic rifle sight and, more particularly, to a telescopic rifle sight with automatic setting of the elevation.

BACKGROUND OF THE INVENTION

The difference between sharpshooting rifles on the one hand and hunting rifles with telescopic sight and assault rifles on the other hand consists primarily in their much wider operational range, wherefore on the telescopic rifle sight means for setting the elevation corresponding to the ballistics of the ammunition being used is required. These consist mostly of an elevation-adjusting drum, with setting marks for the respective distances engraved at their circumference.

For the sharpshooter, however, the main problem consists in establishing the distance, in order to set that value on the elevation-adjusting drum. Since the operation range for sharpshooting rifles can reach approximately 1000 m, depending on the ammunition used, the sniper is totally overburdened in variable terrain- and visibility conditions. Therefore, one has to deal with large mistakes in the distance estimates, which to leads to missed shots even with the most accurate weapons.

There have already been attempts to establish the distance with greater precision with the aid of the rifle telescope itself. Such as with telescopic rifle sights with variable enlargement, oscillating inner tubes with inversion systems and with height- and lateral adjustment screws. The distance measurement is primarily based on the fact that it is possible to evaluate quite accurately the size of the target which is known (body size, rump length, shoulder width, head size, etc) and to compare it with the marks in the sight graticule of the telescopic rifle sight. Hereby again there are two kinds of telescopes with variable enlargement, namely such with variable and such with constant sight graticule. As is the case with the former, a calculation has to be made $$\left(\text{distance} = \frac{\text{target size in m} \times 1000}{\text{number of mark intervals}}\right),$$

in the case of the latter, the distance can be established with the aid of an enlargement table.

However, it is evident that this is also not a viable solution for serious situations, since after the distance determination, it is first necessary to set the elevation-adjusting drum on the respective distance mark. For this, the rifle has to be removed from its shooting position in order to read the marks on the telescope and to adjust it accordingly, as far as this is altogether possible under poor visibility conditions (such as dusk, etc.). If after that the sniper seeks his target again, in most of the cases he will find that it has disappeared and he has missed a favorable opportunity.

OBJECT OF THE INVENTION

It is therefore an object of the present invention to provide a telescopic rifle sight with built-in distance-measuring means and automatic elevation adjustment, in which after the evaluation of the target size, it is possible to fire the shot immediately, without losing the target from the field of vision.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 3:
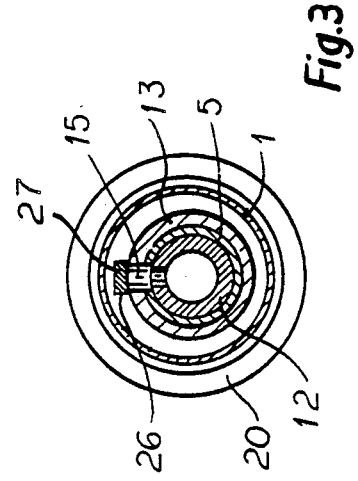
FIG. 3 is a cross-sectional view taken along line C-D of FIG. 1.
Figure 1:
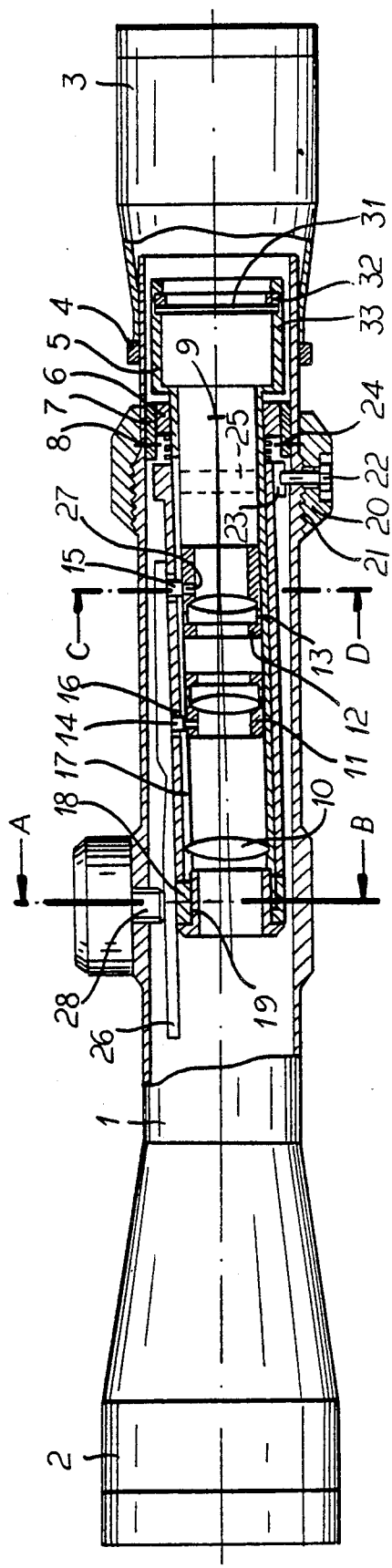
FIG. 1 is a side elevational view, partly in axial section, of the telescopic rifle sight according to the invention.
Figure 2:
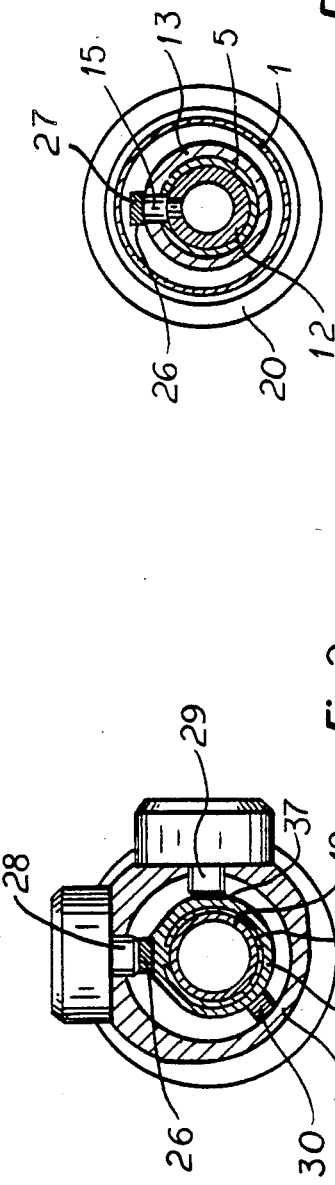
FIG. 2 is a cross-sectional view taken along line A-B of FIG. 1.

The telescopic rifle sight consists according to FIG. 1 of the main tube 1, which has the objective lens system threaded into its widened frontal end, and the ocular lens system mounted in the eyepiece socket 3 threaded to its rear end. After individual setting of the sight graticule 31, the eyepiece socket 3 is fixed with the locking ring 4. The inner tube 5 is oscillatingly supported in the main tube 1 via a vulcanized rubber ring 6 forming the oscillation point 9 and the holding ring 7 mounted to the main tube with the countersunk bolts 8. The inner tube 5 represents the optical axis and thus creates the possibility for the precise adjustment of the telescopic rifle sight vertically and laterally, as well as for the setting of the elevation required by various distances. At its frontal end, the inner tube 5 carries a collective lens 10 and at its central portion, two longitudinally slidable inversion-lens systems. The frontal inversion-lens system 11 with the frontal displacement screw 14 and the rear inversion-lens system 12 with the rear displacement screw 15 are controlled through two separate cam slots 16 by the guide tube 13 which is rotatably supported on the inner tube 5. The rear slot is formed as a spiral with a constant pitch, while the frontal slot is formed as a spiral with increasing pitch. The two displacement screws, on the one hand, are guided in the longitudinal slot 17 of the inner tube 5, which does not allow for their rotational movement, but only for their longitudinal movement, and, on the other hand, in the frontal, and rear slots 16 of the guide tube 13, which causes the longitudinal displacement of the screws 14 and 15. When the guide tube 13 is rotated, the two inversion lens systems 11 and 12 are displaced longitudinally and with respect to each other in such a manner, that a variable enlargement of the target object and a sharp image thereof results in the fixed image plane of the eyepiece. The rotation of the guide tube 13, takes place by a setting ring 20 threaded on the thread 21 of the main tube 1 and wherein an entrainment screw 22 is threaded, which reaches inwardly through a radial slot 25 of the main tube 1 into axial groove 23 of the guide tube 13 and entrains the same. A guiding ring 18 is non-rotatably slid over the frontal end of the inner tube 5 and this ring enables the support and oscillation of the inner tube 5 through height-adjusting screw 28 and the lateral adjusting screw 29 and through the back-pressure spring 30 and is kept in place by the locking socket 19. The pressure spring 24 behind the guide tube 13 presses the latter forwardly, against the fixed guide ring 18, so that an undesirable longitudinal displacement of the guide tube 13 cannot occur neither during the oscillation of the inner tube 5 nor during the rotation of the setting ring 20.

The sight graticule of a telescope establishes the optical axis and has therefore to remain always in the center of the field of vision (aperture stop) and to be clearly visible. Further, in order to insure that the sight graticule maintains its image size at all times, independently from the enlargement, so that it can serve as a measuring base, the sight graticule 31 is threaded with its socket ring 32 into the inner thread 33 at the rear end of the inner tube 5. There it is brought within the ocular image plane created by the two inversion-lens systems 11 and 12 and fixed.

Figure 6:
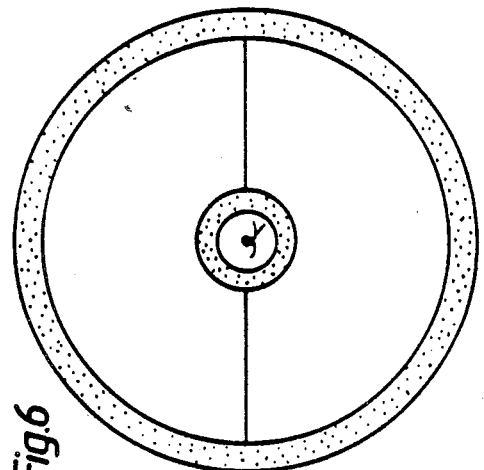
FIGS. 4-6 are diagrammatic views of the sight graticule.
Figure 5:
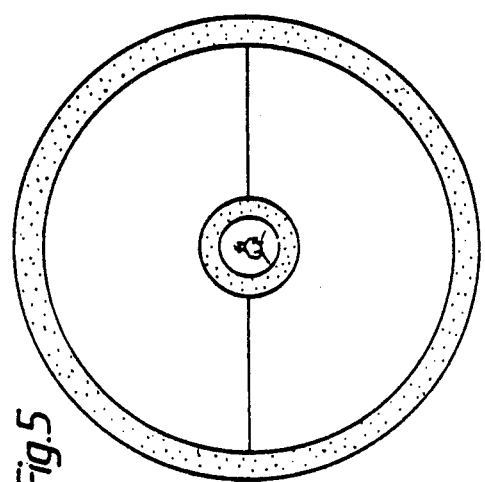
Figure 4:
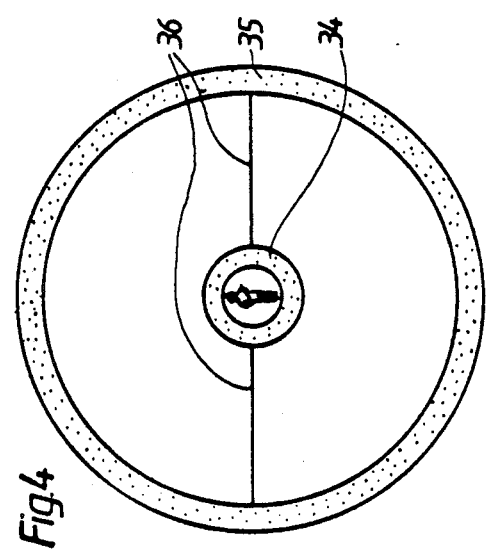

The sight graticule 31 according to the invention is represented in FIGS. 4, 5 and 6. It consists of a circular ring 34 of the diaphragm 35 and the two horizontal stadia lines 36 which are all produced at the same time photographically on a thin glass plate. The annular sight graticule 34 is in the first place especially well suited for aiming, since it permits the rapid perception and centering of the target, like no other sight graticule, without the target being partially covered by lines or bars. In the second place, due to its wide ring, it can even be used in poor visibility conditions, and especially at dusk, when on a dark background only individual, unrelated ring segments are discernible, since even then the eye can immediately find the center of the ring, by instinct. In the third place, the annular sight graticule 34 is much better suited for the rapid target survey than a graduated dial or a bar graticule, since the target need only be brought into the circle and its possible inclination does not have any importance. The diaphragm 35 limits the field of vision in such a way that no disturbing shadow is visible, even with the widest oscillations of the inner tube 5. Since the sight graticule 34 is always in the center of the field of vision, the diaphragm 35 is appropriately manufactured together with the annular sight graticule 34, whereby the complicated centering of the two is eliminated. The sight graticule plate 31 can thereby be located slightly eccentrically within the socket ring 32, which is not any more a diaphragm ring, since this small aberration can be eliminated during adjustment. The two thin horizontal lines 36 indicate immediately to the sniper a possible tilting of his weapon, without partially covering the target.

The distance measurement with the telescope rifle sight takes place according to the invention in such a manner that the enlargement of the telescope is proportional to the distance. If the factor $f=1$, a three-fold enlargement equals 300 m, a five-fold enlargement 500 m, and a nine-fold enlargement 900 m distance. When the proporionality factor is smaller or greater than 1, the above-indicated enlargements can equal for instance 150–250–450 m, 200–333–600 m, 250,417, 750 m or 400–667–1200 m in distance. In our example, for the sake of simplicity, a telescopic rifle sight with a 3 to 9-fold enlargement and a factor $f=1$ is given, which means that the telescope is set for the distances from 300 to 900 m. Since the annular sight graticule 34 remains constant, it can be dimensioned for any target size. In our example, the annular sight graticule 34 is set for a "forward running figure" and has therefore an inner diameter of 20 lines, e.g. closely 2 m to 100 m distance. A figure of about 1.8 m in size would therefore fit accurately within the annular sight graticule, without being covered in anyway by it. If we assume that this figure stands at a distance of 700 m, it appears to be 7 times smaller and a 7-fold enlargement is necessary, in order to make it look the same size as at 100 m. In the reverse, the figure of known size, independently of the distance at which it is located, has to be enlarged only as many times as to fit precisely within the annular sight graticule 34, and then the distance already related to the enlargement has only to be read on the circumference of the setting ring 20.

In order to avoid that the weapon is retracted from its aiming position, for the reading of the distance and the setting of the elevation-adjusting drum, an automatic setting of the elevation is provided with the aid of the cam template 26 according to the invention. The cam template 26 is represented in FIGS. 1, 2, 3 and 7. It is securely connected to the rear displacement screw 15 via the fastening screw 27 and follows the forward - and backwards movements of the same. In the front, the cam template 26 is laterally guided in a recess of the guide ring 18 and slid under the height-adjusting screw 28. This frontal part of the cam template 26 which slides through underneath the height-adjusting screw 28 represents the actual cam part, which is adjusted in height to the ballistics of the used ammunition and with which the elevation is set. Since the rear slot 16 of the guide tube 13 wherein the rear steering screw is gliding, represents a thread line with constant pitch, to each position of the setting ring 20 which sets the enlargement, corresponds a directly proportional position of the guide tube 13, and of the rear steering screw 15, as well as a precisely defined position of the cam template 26 with its height defining the elevation, lying under the height-adjusting screw 28. Therefore, when with the setting ring 20 a certain enlargement of the target object is set for the distance measurement, due to the cam template 26, the right elevation for the ballistics of the used ammunition is automatically set. Without retracting the weapon from its aiming position, the shot can be fired immediately. After that, the shooter, if interested, can read the distance at which he aimed the shot engraved on the setting ring 20.

Figure 7:
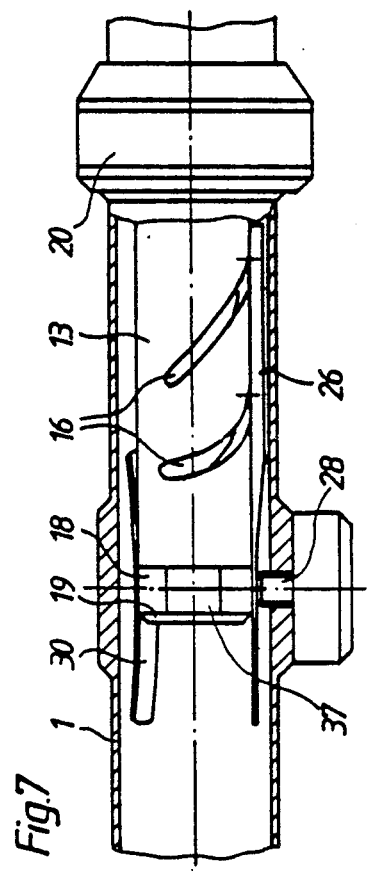
FIG. 7 is a detailed axial section of the adjustment mechanism of the rifle sight of FIG. 1.

For the adjustment of a telescope with a pivotable inner tube as a rule, the inner tube has always to be swung in the direction of the intenced shot. That means that with increasing distance and elevation, the inner tube 5 has to be swung increasingly upwardly. The cam tamplate 26 has therefore, according to FIG. 1, a curved part becoming lower and lower from the front to the back, so that the inner tube 5 can be pushed upwardly by the back-pressure spring 30. At this forward motion, the cam template 26 which is highest in the front, participates in this upward motion of the inner tube 5, and in the case of intensely curved trajectories and large distances there is the danger that the cam template 26 hits the main tube 1 with its frontal end and is bent by the impact. In order to avoid an undesired enlargement of the main tube 1 and to optimally use the constricted space conditions, the telescopic rifle sight, as shown in FIG. 7, is inverted with its present downside up, so that the height-adjusting screw 28 is turned downwardly and the laterally adjusting screw 29 is turned to the left. As a result, the the size and motion-relationship is reversed and very surprising effects occur as far as the space utilization and the handling of the telescopic rifle sight are concerned. The cam template 26 is now lowest at its frontal end and gradually increases in height in its curved part, towards the rear, whereby the inner tube 5 is raised against pressure of the flat spring 30, during its forward motion. Since the cam template 26 participates again in this case in the oscillatory movement of the inner tube 5, the lower frontal end of the cam template 26 moves away from the main tube 1 during the forward motion, so that a contact is avoided. Besides, the optical axis of the inner tube 5 can be maintained much better in the center of the main tube 1, than is possible according to FIG. 1, and finally, logical rotation directions for all adjustment screws are established. So for instance, when the height-adjusting screw 28 is turned to the right, the impact point, as expected, moves upwardly, and when the lateral adjustment screw 29 is turned to the right, the impact point, as expected, moves to the right. The only modification to be made in the telescopic rifle sight according to FIG. 7, compared to that of FIG. 1, is the rotation of the setting ring 20 by 180°, so that the distance graduations can be read from above. For this purpose, it is merely necessary to arrange the entrainment screw 22 diagonally opposite, in the center of the distance dial on the setting ring 20.

If, in addition to that, for large distances, it is desirable to automatically correct the right-side deviation of the projectile due to the right-side rifling derivation, the glide surface 37 of the guiding ring 18 provided for the lateral adjustment screw 29 has to be inclined from above downwardly in such a manner that, with increasing elevation, a small displacement to the left of the inner tube 5, and therewith of the impact point, occurs automatically.

According to the invention, all the sharpshooter has to do is sight his target and to keep it enlarged at the same prescribed size in the annular sight graticule 34, as represented in FIG. 4 with a "forerunning figure", in FIG. 5, with a "bust figure" and in FIG. 6 with a "head figure". Afterwards, the shooter can immediately fire the shot, since he instinctively already has the target in the center of the annular sight graticule 34, thus in the target point, and the setting of the correct enlargement automatically establishes the setting of the elevation for the corresponding distance. Besides, it is also to the advantage of the shooter that not only do the size relationships of the target object remain the same in the annular sight graticule 34, but also that the entire field of vision after the measuring of the target always stays constant, a circumstance which can also be used for distance measuring, under certain conditions. Furthermore, all this is still possible in visibility conditions, wherein a measuring of the target would be impossible with a graduated dial, and with a rapidity unknown heretofore.

In order to keep the shooter informed about the technical data of its telescopic rifle sight, the telescope is provided with the information about the available enlargement and their coordination with the distance (e.g. 3-9-fold enlargement=200-600 m) about the size of the annular sight graticule 34 (inner diameter, for instance d=30) for which type of ammunition the cam template 26 is set (for instance caliber 7.62×51). This information is suitably printed on an adhesive label, since with the exception of the built-in enlargement, all other indications can be modified.

In FIGS. 8 to 12, in an embodiment example a further advantageous development of the telescopic rifle sight according to the invention is represented.

The aforedescribed sight for sharpshooting rifles still presents the disadvantage that one of the hands of the sharpshooters is busy with the adjustment of the sight, whereby the weapon can not be kept in a position ready to be fired. With the system of FIGS. 8-12, this problem is solved by setting the required elevation with the aid of a motor, which is controlled by one or more switches from the trigger device.

Figure 8:
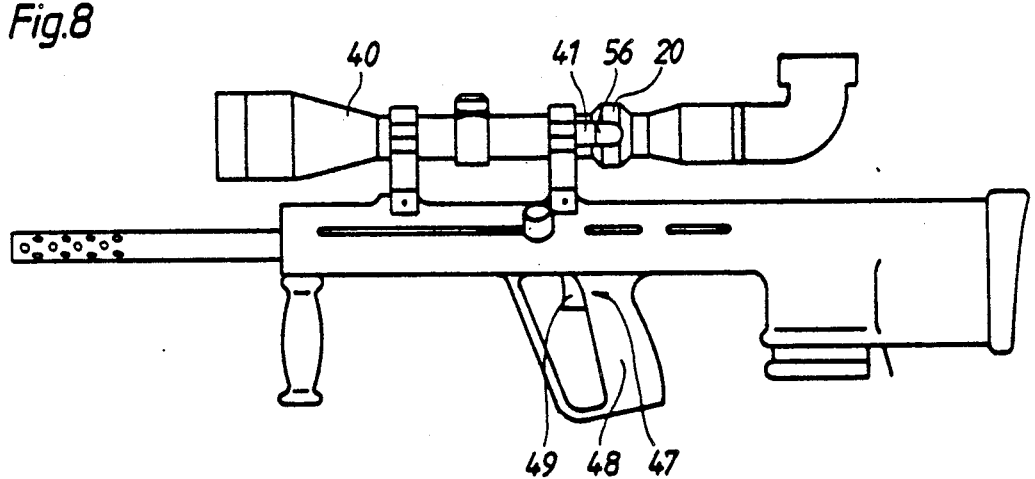
FIG. 8 is a side elevational view of a weapon equipped with the telescopic rifle sight.

In FIG. 8, a motor 41 is flanged laterallly to the telescope 40, close to the setting ring 20.

Figure 9:
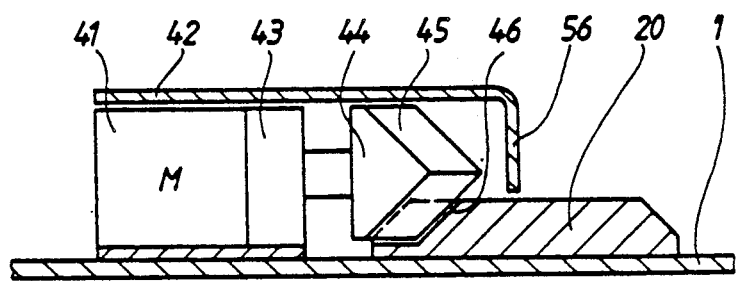
FIG. 9 is an enlarged detail view in section of the motor drive for the automatic adjustment of the scope.

As can be seen from FIG. 9, the motor 41 is fastened to the main tube 1 by means of the clamp 42. A pinion 44 is actuated via a gearing 43. The pinion 44 engages with its teeth 45 in a rim of a toothed wheel of the setting ring 20. By driving the motor 41 in one of the two directions, the setting ring 20 is also turned in each respective direction, and in this way the distance measurements, respectively, the setting of the required elevation is performed.

Since in the present embodiment the setting ring 20 is screwed to the main tube 1 via a thread, the setting ring 20 carries out a small longitudinal displacement in the longitudinal direction of the main tube 1. This longitudinal displacement is compensated by the correspondingly deep configuration of the teeth 45 of the pinion 44 and the rim of the toothed wheel 46.

The pinion can also be built in a different manner, for instance the teeth can be arranged radially, whereby the rim of the toothed wheel of the setting ring 20 also must have radially arranged teeth. This way, larger longitudinal displacements of the setting ring 20 can be bridged.

The motor 41 is electrically actuated. Within the framework of the invention, other types of motors can also be used, such as hydraulic motors.

Figure 11:
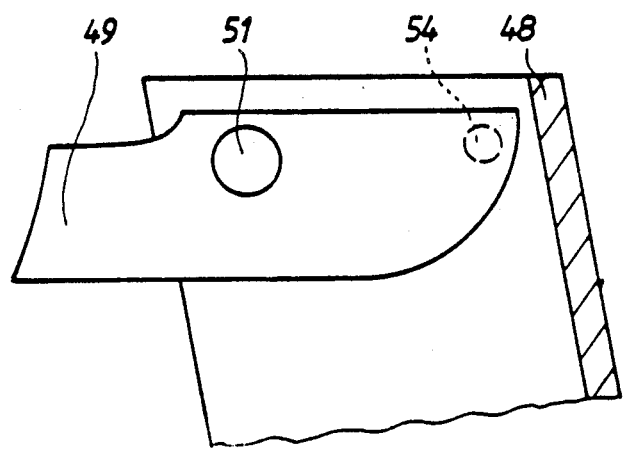
Figure 12:
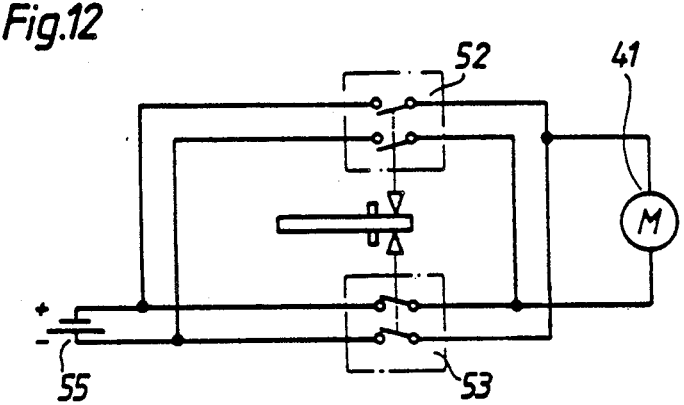
FIG. 12 is a circuit for the control of the servomotor.

FIGS. 11 and 12 show the trigger device in two lateral sections, the drawing being not made to scale, but only as a schematic representation.

According to the invention, the control of the motor 41 is performed with the aid of switches, which are arranged on the trigger device. In the present embodiment example, the switches are most advantageously connected with the trigger cock. Thereby the shooter, by merely swinging the cock laterally, can switch the motor 41 into each of the two directions of rotation, until the right elevation is set and the right distance is indicated.

The trigger device (reference numeral 47 in FIG. 8) comprises the handle 48 and the cock 49. The cock 49 is supported rotatably about the axle 50 in the handle 48. The axle 50 is connected rigidly to the cock 49 with the rubber elements 51. The rubber elements have the effect of holding the cock within the handle 48 in its defined position. However, by laterally applying force to the cock 49 (with the trigger finger) the cock can be easily swung in both directions.

Laterally on the cock, two switches 52, 53 are provided. The switches are fastened in the handle 48 and the two switch members 54 rest against the cock 49.

When the cock 49 is swung against the force of the rubber elements 51, one or the other switch is actuated, in order to set the motor 41 in motion, in the respectively desired direction.

FIG. 12 shows a circuit which is advantageous for the connection of the trigger device 47 with the motor 41. The battery 55 supplies the circuit arrangement. The cock 49 actuates the two switches 52, 53 and these alternately switch on the corresponding polarity of the motor 41.

Figure 10:
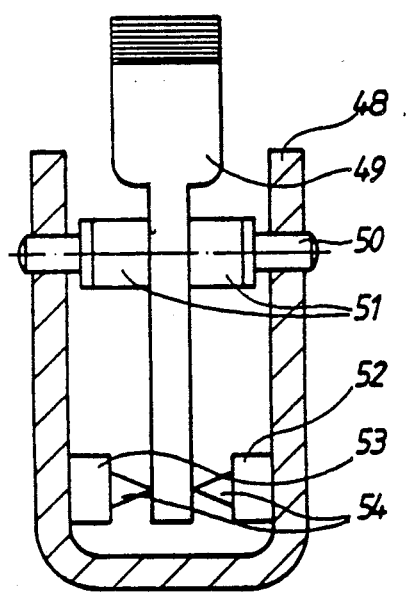
FIGS. 10 and 11 are enlarged sectional view through the trigger device.

The trigger device is only schematically shown in the FIGS. 10, 11. So, for instance, the required development of the further trigger construction for the discharge of the shot is missing. The lateral displacement of the cock can be achieved through other steps. Also, the axle 50 can be rigidly connected with the cock 49 (without the interposition of rubber elements), and the support of the axle 50 takes place in recesses of the handle 48, which have enough play to permit the displacement. The directive force for the centered setting of the cock can originate from additional springs or from the adjusting springs of the switches 52, 53.

In the embodiment example according to FIGS. 8, 9, the distance setting is effected by the motor 41 and the pinion 44. The pinion 44 is covered by a hood 56, in order to avoid inadvertent touching or dirtying of the pinion.

In case of failure of the motor 41, the setting ring 20 can also be manually operated, as described before, so that the functional capability of the weapon is safeguarded. In a preferred manner, the trigger device, as a unit, can be mounted and dismounted.

In variations of the represented embodiment examples, the motor 41 can also directly act upon the guide tube 13, without the interposition of the setting ring 20. However, advantageously the setting ring 20 is still provided, in order to maintain the possibility of manual actuation, in an emergency.

The battery 55 which supplies the motor 41 is advantageously lodged used for the gun stock or in the handle 48. The battery can also be in the electrical detonation of the rifle shell.

What is claimed is:

1. The telescopic rifle sight, comrising:
a main telescope tube having a sighting end and an objective and;
an objective lens system in said main tube at said objective end;
an inner tube received in said main telescope tube and provided with means for mounting said inner tube between ends thereof to swing relative to said main tube at least in a vertical plane;
a cam tube rotatable on said inner tube and swingable therewith;
a variable enlargement optical system in said inner tube and including at least one axially displaceable lens have a lens ring, and a displacement screw directly connected to said lens ring and axially entrained by said lens for axially displacement of said displacement screw by said lens ring, said displacement screw being engaged by a cam surface of said cam tube for displacement upon rotation of said cam tube;
a setting ring rotatable on said main telescope tube and operatively connected with said cam tube for rotating same to set the telescopic sight for different object distances;
an elevation-setting screw on said main telescope tube extending into said main tube for adjusting an angular position of said inner tube in said plane; and
a linear generally wedge-shaped cam element extending along said inner tube, connected directly to said displacement screw and passing between said elevation-setting screw and said inner tube for automatically setting the elevation of said sight upon axial displacement of said lens ring and said axially displaceable lens of said lens system to vary the enlargement of said optical system.

2. The telescopic rifle sight, comprising:
a main telescope tube having a sighting end and an objective and;
an objective lens system in said main tube at said objective end;
an inner tube received in said main telescope tube and provided with means for mounting said inner tube between ends thereof to swing relative to said main tube upwardly and downwardly as well as laterally;
a cam tube rotatable on said inner tube and swingable therewith;
a variable enlargement optical system in said inner tube and including at least one axially displaceable lens have a lens ring, and a displacement screw directly connected to said lens ring and axially entrained by said lens for axially displacement of said displacement screw by said lens ring, said displacement screw being engaged by a cam surface of said cam tube for displacement upon rotation of said cam tube;
a setting ring rotatable on said main telescope tube and operatively connected with said cam tube for rotating same to set the telescopic sight for different object distances;
an elevation-setting screw on said main telescope tube extending into said main tube for adjusting an angular position of said inner tube in an up and down direction;
a lateral-adjustment screw on said main telescope tube extending into said main tube laterally for adjusting an angular position of said inner tube in a lateral direction;
means forming an inclined guide surface on said inner tube cooperating with said lateral adjustment screw for shifting said inner tube in said lateral direction as said inner tube is angularly displaced in an up and down direction, said inner tube being braced against said main tube by a spring; and
linear generally wedge-shaped cam element extending along said inner tube, connected directly to said displacement screw and passing between said elevation-setting screw and said inner tube for automatically setting the elevation of said sight upon axial displacement of said lens ring and said axially displaceable lens of said lens system to vary the enlargement of said optical system.

3. The telescopic sight defined in claim 1 or claim 2 wherein said elevation-setting screw is located on an underside of said main tube so that a rotation of the elevation-setting screw in the clockwise sense effects an adjustment of a target point of the sight upwardly.

4. The telescopic sight defined in claim 2 wherein said lateral-adjustment screw is provided on a left side of said main tube as seen facing from from said sighting end toward said objective end and rotation of said lateral-adjustment screw in the clockwise sense effects a shift in a target point of said sight to the right.

5. The telescopic sight defined in claim 1 or claim 2 wherein said inner tube is formed proximal to said sighting end with a thin glass membrane provided with a marking representing a dimension of the target in the form of a ring having a center corresponding to the target center of said sight, said variable enlargement optical system casting an image of said target on said membrane.

6. The telescopic sight defined in claim 5 wherein said marking has a width of about one-third the inner diameter of said ring marking.

7. The telescopic sight defined in claim 1 or claim 2, further comprising an electric motor operatively connected to said cam tube for rotating same, and switching means having a control member proximal to a trigger of a weapon provided with the telescopic sight for directionally driving said motor.

8. The telescopic sight defined in claim 7 further comprising rubber elements bracing said control member for resisting displacement thereof.

9. The telescopic sight defined in claim 1 or claim 2 wherein said inner tube is provided with a guide ring at an end thereof remote from said sighting end and in a common plane with said elevation-setting screw, further comprising a leaf spring bearing upon said guide ring at a location angularly offset from said elevation setting screw about an axis of said inner tube.

* * * * *